United States Patent

Groff

[11] 3,996,810
[45] Dec. 14, 1976

[54] TRACK SUPPORTING ROLLER WITH RESILIENT RIM

[75] Inventor: Eugene R. Groff, Chillicothe, Ill.

[73] Assignee: Caterpillar Tractor Co., Peoria, Ill.

[22] Filed: Oct. 3, 1975

[21] Appl. No.: 619,338

[52] U.S. Cl. .................. 74/230.3; 74/230.5; 74/230.1; 74/443; 305/25
[51] Int. Cl.² .................................. B62D 55/14
[58] Field of Search ............. 305/24, 25, 27, 28, 305/56, 57; 74/230.3, 230.7, 230.1, 230.5, 229; 301/63 PW, 63 C

[56] References Cited
UNITED STATES PATENTS

| | | | |
|---|---|---|---|
| 522,466 | 7/1894 | Gunther | 74/230.7 |
| 2,416,197 | 2/1947 | Moyer et al. | 74/230.7 |
| 2,685,801 | 8/1954 | Tishman | 74/230.4 |
| 3,910,128 | 10/1975 | Boggs et al. | 305/27 X |

Primary Examiner—Robert B. Reeves
Assistant Examiner—John P. Shannon
Attorney, Agent, or Firm—Oscar G. Pence

[57] ABSTRACT

A rotatable track supporting member for a track-type vehicle has a hub rotatably carried upon a track frame of such vehicle and a rim which is constructed from segmented resilient material so as to reduce the amount of noise generated by the running engagement between the rim and an endless track chain mounted for movement about the track frame.

3 Claims, 3 Drawing Figures

TRACK SUPPORTING ROLLER WITH RESILIENT RIM

BACKGROUND OF THE INVENTION

This invention relates to track supporting rollers and the like for track-type vehicles, and more particularly, to apparatus for reducing the noise generated by the running engagement of an endless track chain over such roller.

In the past, the treads or track engaging rims of track supporting rollers have been made of hardened metal or steel so as to provide relatively long service life. The track rails of the endless track chains which ride across such rims are also made of steel. Thus, during movement of the vehicle, a considerable amount of noise is generated due to the metal-to-metal running engagement or impact of the track rails with the metal rims of such prior art rollers.

Present day awareness of noise pollution has made such noise exceedingly objectionable; and new restrictions regulating the maximum acceptable noise levels of earthmoving vehicles has made it desirable to provide a method for reducing the noise generated at the track supporting rollers of such vehicles.

Prior attempts at reducing such noise by the use of a solid rubber wheel or rim have not been entirely successful due to their relatively short service life.

SUMMARY AND OBJECTS OF THE INVENTION

Accordingly, it is an object of this invention to provide an improved rotatable track supporting member or roller for track-type vehicles which is effective in reducing the noise generated between the running engagement of the endless track chain of the vehicle and such roller.

Another object of this invention is to provide such roller, which while reducing such noise, also exhibits a long wear life so as to minimize the high cost of replacing worn parts.

Another object of this invention is to provide a track supporting roller which, while satisfying the above objects, is simple in construction and economical to manufacture.

Other objects and advantages of the present invention will become more readily apparent upon reference to the accompanying drawings and following description.

DESCRIPTION OF THE PREFERRED EMBODIMENT

Figure 1:
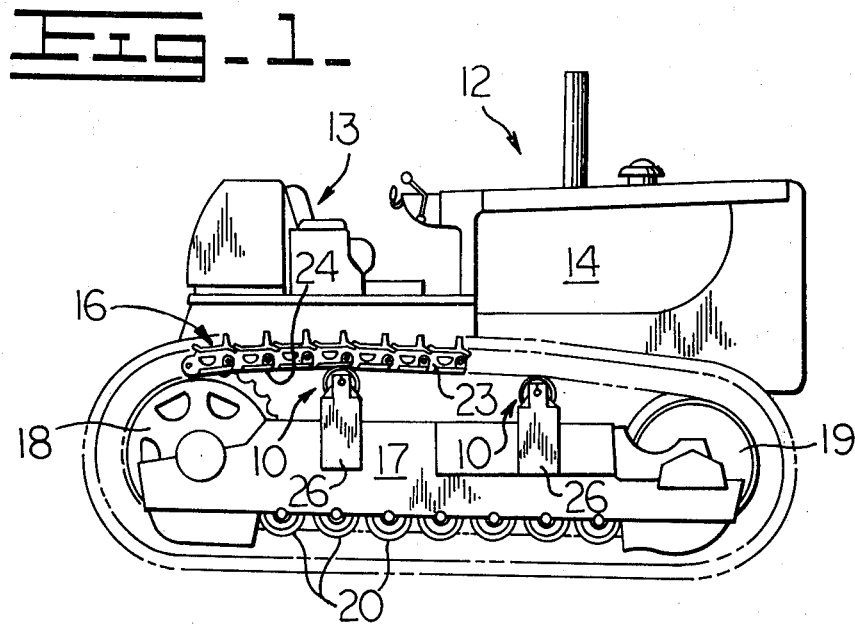
FIG. 1 is an overall side elevational view of a track-type vehicle in which a rotatable track supporting member embodying the principles of the present invention is employed.

Referring more particularly to the drawings, a track-type vehicle, such as a crawler tractor 12, is shown which conventionally includes an operator's station 13 and an engine 14. The tractor is supported for movement by a pair of endless track chains, one of which is shown at 16, each of which is operatively driven about a track frame 17 by a drive sprocket 18 in a conventional manner. For supporting the track chain, the track frame 17 includes a plurality of rotatable track supporting members, such as one or more carrier rollers 10, a front idler wheel 19 and a plurality of lower track rollers 20. The endless track chain 22 is preferably constructed in a conventional manner and includes a pair of laterally spaced track link chain assemblies, one of which is shown at 23, each of which provides an inner rail surface 24.

Figure 2:
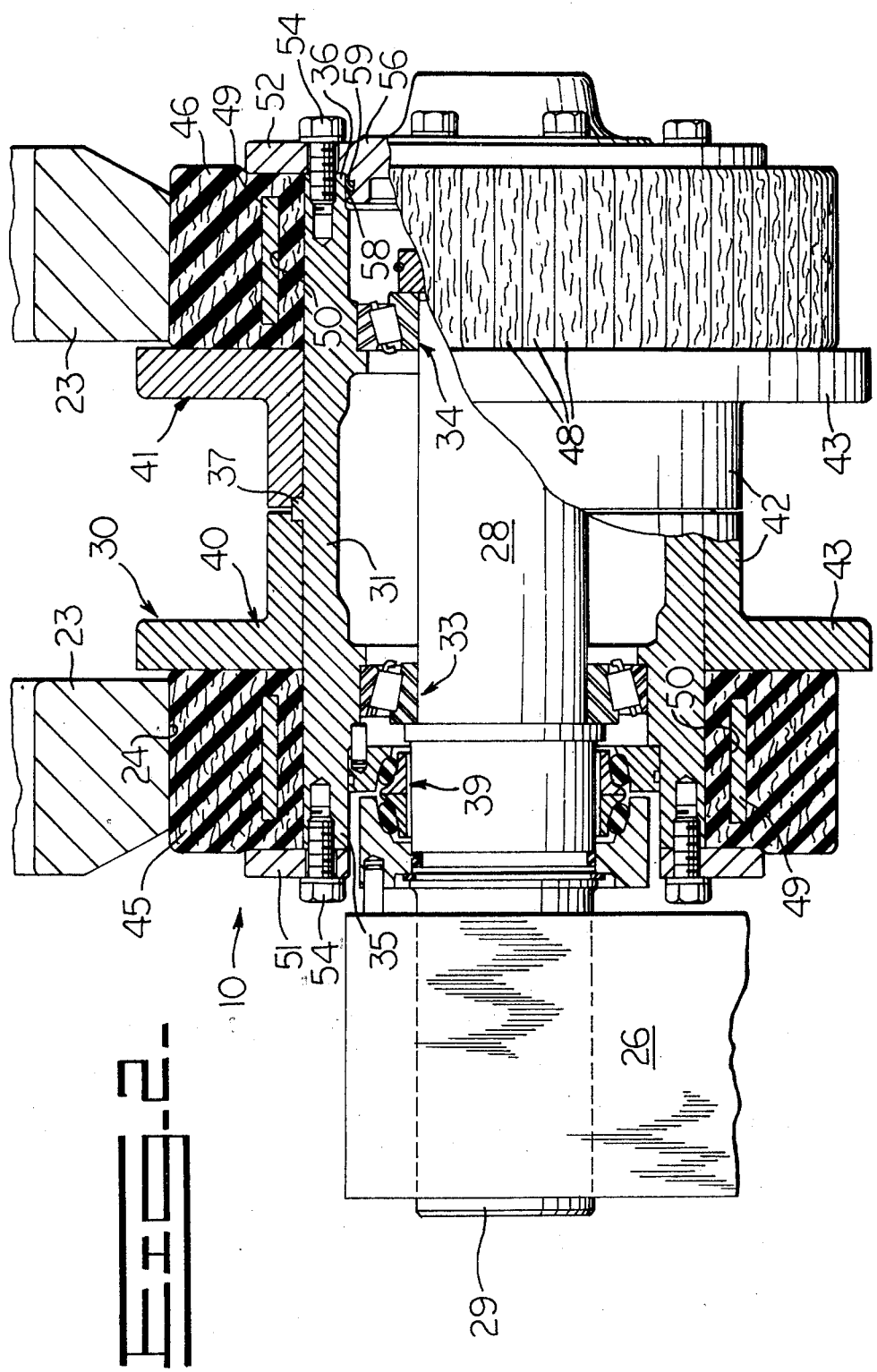
FIG. 2 is a longitudinal cross sectional view of such rotatable track supporting member taken along the line II—II of FIG. 1 with a portion thereof shown in elevation.

Each of the carrier rollers 10 is mounted on the track roller frame 17 by an upstanding bracket 26 for supporting the upper portion of the endless track chain. As best shown in FIG. 2, each of the carrier rollers 10 includes an elongated shaft 28 having a protruding end 29 for mounting to the bracket 26. The roller also includes a rim assembly 30 including a cylindrical hub 31 rotatably journalled about the shaft 28 by a pair of axially spaced tapered roller bearing assemblies 33 and 34. The hub has opposite ends 35 and 36 and a central flange or rib 37 formed about the periphery thereof.

Adjacent the inner periphery of the end 35 of the hub 31, suitable sealing apparatus, generally designated 39 is employed to prevent the entry of foreign material into the bearing area of the rim assembly and to retain lubricant therein in a usual manner.

The rim assembly 30 also includes track guide flange apparatus, such as a pair of flanged guide members 40 and 41. Each guide member is positionable about the periphery of the hub on the opposite sides of its central flange 37 and in axially positioning, abutting engagement thereagainst. Each guide member preferably includes a cylindrical portion 42 which is disposed in closely fitting relation about the hub and a radially extending flange portion 43. The flange portions 43 are laterally spaced for receipt in closely spaced relation adjacent respective ones of the spaced apart link chain assemblies 23 for guiding the chain laterally as it moves across the roller.

Figure 3:
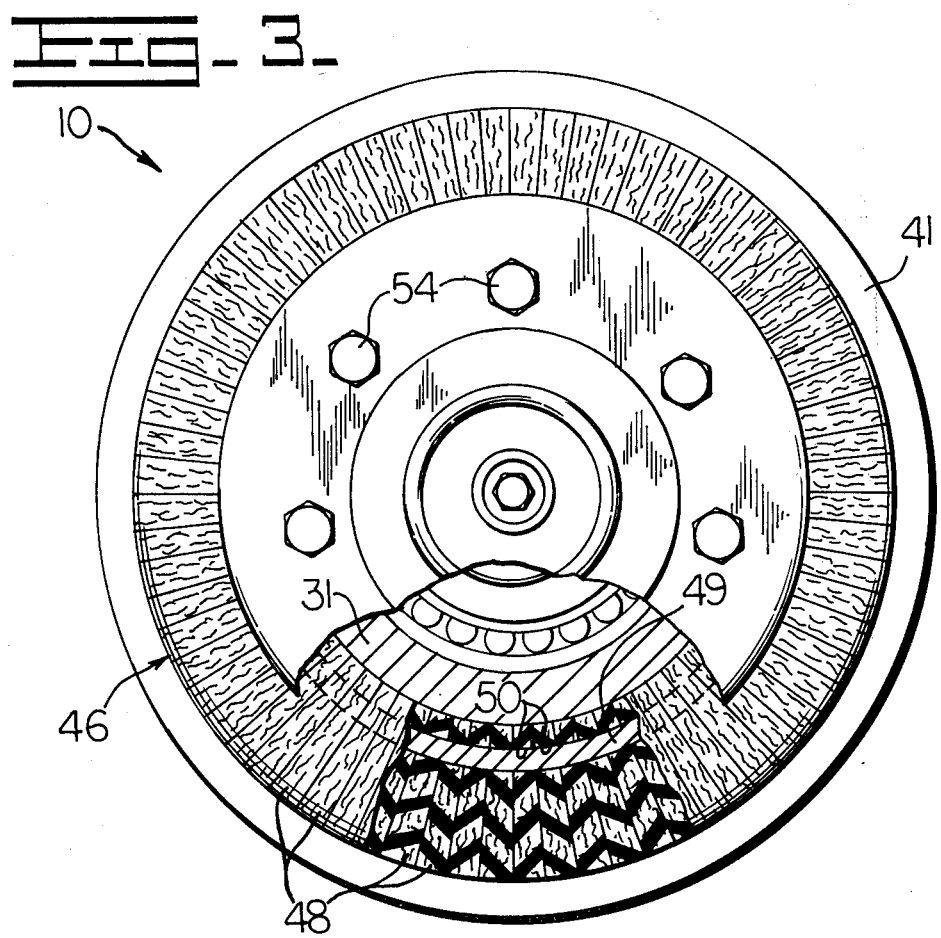
FIG. 3 is an enlarged end view of the member of FIG. 2 taken along the line III—III of FIG. 2 and with a portion broken away to illustrate the construction of one of the rims thereof.

Mounted on the outside of each guide member is one of a pair of resilient rims 45 and 46 to which the present invention more closely appertains. Such rims are constructed from a plurality of separate pads 48 having a generally rectangular shape when viewed in a direction lengthwise of the shaft 28, FIG. 2, and a circular ring sector shaped configuration radially thereof, as shown in FIG. 3. The pads 48 are permanently banded together into an annular configuration by a steel band 49. The band is preferably disposed internally through the pads by receipt through a suitable aperture 50 formed in each of the pads. Such apertures are preferably adjacent the inner peripheries of the pads. The band is formed into a continuous ring by securing its opposite abutting ends together in any suitable manner, such as by welding.

In general, the pads 48 are constructed from a fiber reinforced elastomeric material so as to provide excellent sound deadening characteristics, as well as a long service life. While rubber is the elastomeric material principally contemplated herein, any of the well known synthetic elastomeric materials may also be used. Also, any suitable fiber material, such as steel, nylon, fiberglass, polyester or rayon may be used to provide the pads with the desired wear characteristics.

In particular, the fiber reinforcing material is preferably braided and woven into a fabric with the pads being constructed from a plurality of layers of plys of such fabric running lengthwise thereof which plys are impregnated with rubber and permanently bonded together into a laminated construction.

Alternately, the pads 48 may be constructed from a mixture of rubber and loose, chopped reinforcing fibers dispersed throughout the rubber. Depending on which of the fiber materials mentioned above is used, the mixture will be 10-150 times stronger than rubber itself so as to provide the long service life desired.

A pair of flanged retainers 51 and 52 are detachably secured in any suitable manner, such as by bolts 54, to the opposite ends 35 and 36, respectively, of the hub 31. The flanged retainers are positionable in axially clamping engagement against their respective rims 45 and 46. Thus, the rims are fixedly clamped between such retainers and their respective guide members 40 and 41 for securing the rims to the rim assembly 30 and to prevent any rotation thereof relative to the hub 31. The retainer 52 is preferably provided with a circular body portion 56 for serving as a cover for the adjacent open end of the hub for preventing loss of lubricant therefrom or the ingress of foreign materials into the roller. In this regards, a seal 58 maybe provided in a suitable groove 59 formed in the retainer for sealing engagement against the adjacent inner periphery of the hub 31.

Thus as is readily apparent from the above, the resilient rim of the present carrier roller provides a cushioned surface for the link chain assemblies 23 to ride upon, thus eliminating any metal-to-metal engagement, as found in prior art rollers. This, as will be appreciated, greatly reduces the noise generated by the running engagement of the track over the roller. Further, the segmented rims constructed from separate pads of rubber impregnated fabric material or a mixture of rubber and chopped fiber material are extremely resistant to wear, thus providing a long service life.

It should be understood that the present invention has been shown and described with particular reference to the carrier roller 10 merely by way of illustration and that it is equally well adapted for use in the other rotatable track supporting members, such as the front idler wheel 19 and the track rollers 20 wherein such use is contemplated.

While the invention has been described as shown with particular reference to the preferred embodiment, it will be apparent that variations might be possible that would fall within the scope of the present invention, which is not intended to be limited except as defined in the following claims.

What is claimed is:

1. A carrier roller for a track-type vehicle for supporting an endless track chain thereof having a pair of laterally spaced track link chain assemblies, each having an inner rail surface, said carrier roller comprising:
    a stationary shaft;
    a cylindrical hub rotatably journalled about said shaft and having opposite end portions and a center portion intermediate said end portions;
    a pair of radially extending flange members mounted about the center portion of the hub in inner lateral guiding relationship between said chain assemblies of the track;
    a pair of laterally spaced rims, each mounted about a respective one of said end portions of the hub for track supporting engagement with a respective one of the inner rail surfaces of said track link chain assemblies and having opposite sides with one side thereof abutting a respective one of the flange members;
    a pair of flanged retainers, each being detachably mounted to a respective one of the opposite end portions of the hub in clamped engagement against the other side of each of said rims for fixedly clamping the rims between said retainers and said flange members; and
    said rims being constructed from a plurality of separate pads of fabric reinforced resilient material for reducing the noise generated by the running engagement between the carrier roller and said track chain during movement of said vehicle.

2. The carrier roller of claim 1 wherein each of said pads has a generally rectangular shape lengthwise of said shaft, and with a circular ring sector shaped endwise configuration generated from the axis of the shaft to permit the abutting disposition of the pads in an annular configuration about said hub.

3. The carrier roller of claim 2 wherein said pads are permanently banded together by a steel band disposed internally through said annular configuration, said band having opposite ends welded together to form a continuous ring.

* * * * *